United States Patent
Sum et al.

(10) Patent No.: US 9,055,444 B2
(45) Date of Patent: Jun. 9, 2015

(54) WIRELESS COMMUNICATION SYSTEM, AND INTERFERENCE PREVENTING METHOD

(75) Inventors: Chin-Sean Sum, Tokyo (JP); Hiroshi Harada, Tokyo (JP); Fumihide Kojima, Tokyo (JP); Ryuhei Funada, Tokyo (JP)

(73) Assignee: NATIONAL INSTITUTE OF INFORMATION AND COMMUNICATIONS TECHNOLOGY, Koganei-Shi, Tokyo (JP)

(*) Notice: Subject to any disclaimer, the term of this patent is extended or adjusted under 35 U.S.C. 154(b) by 418 days.

(21) Appl. No.: 13/518,996

(22) PCT Filed: Dec. 15, 2010

(86) PCT No.: PCT/JP2010/007293
§ 371 (c)(1),
(2), (4) Date: Jun. 25, 2012

(87) PCT Pub. No.: WO2011/077672
PCT Pub. Date: Jun. 30, 2011

(65) Prior Publication Data
US 2012/0263112 A1    Oct. 18, 2012

(30) Foreign Application Priority Data

Dec. 25, 2009  (JP) ................................. 2009-293758

(51) Int. Cl.
*H04W 28/04*  (2009.01)
*H04W 28/12*  (2009.01)
(Continued)

(52) U.S. Cl.
CPC ..................................... *H04W 16/14* (2013.01)

(58) Field of Classification Search
None
See application file for complete search history.

(56) References Cited

U.S. PATENT DOCUMENTS

2004/0053621 A1  3/2004  Sugaya
2005/0063372 A1  3/2005  Jeong et al.
(Continued)

FOREIGN PATENT DOCUMENTS

JP  2004-40645   2/2004
JP  2004-242204  8/2004
(Continued)

OTHER PUBLICATIONS

Steve Shearer, 802.15.4g Channel Characteristics (Work in Progress), Apr. 1, 2009, pp. 1-5.*
(Continued)

*Primary Examiner* — Omar Ghowrwal
(74) *Attorney, Agent, or Firm* — Jacobson Holman, PLLC.

(57) ABSTRACT

Where two or more wireless communication networks having mutually different physical layers coexist, and wireless communication is performed between a plurality of devices and a coordinator in each one of the wireless communication networks, the coordinator of one wireless communication network generates coexistence notification frame data to notify coordinators of the other wireless communication networks of existence of the coordinator. This first coordinator encodes the generated coexistence notification frame data, inserts source data so as to be set as FEC data, modulates the FEC data through a Gaussian frequency shifting keying system (GFSK) so as to be set as a GFSK modulated wave signal, and transmits the GFSK modulated wave signal to the coordinators of the other wireless communication networks.

20 Claims, 16 Drawing Sheets

(51) Int. Cl.
*H04L 27/12* (2006.01)
*H04B 15/00* (2006.01)
*H04W 16/14* (2009.01)

(56) References Cited

U.S. PATENT DOCUMENTS

| | | | |
|---|---|---|---|
| 2006/0007907 A1 | 1/2006 | Shao et al. | |
| 2006/0077930 A1 | 4/2006 | Kim et al. | |
| 2008/0018521 A1 | 1/2008 | Sahinoglu et al. | |
| 2008/0159427 A1* | 7/2008 | Kang et al. | 375/260 |
| 2010/0310009 A1* | 12/2010 | Lakkis | 375/308 |
| 2012/0257697 A1* | 10/2012 | Zhou et al. | 375/346 |
| 2012/0263112 A1* | 10/2012 | Sum et al. | 370/328 |

FOREIGN PATENT DOCUMENTS

| | | |
|---|---|---|
| JP | 2005-102218 | 4/2005 |
| JP | 2006-33827 | 2/2006 |
| JP | 2006-115512 | 4/2006 |
| JP | 2006-197177 | 7/2006 |
| JP | 2008-026310 | 2/2008 |
| WO | WO 2005/055493 | 6/2005 |
| WO | WO 2005/099156 | 10/2005 |

OTHER PUBLICATIONS

Jan Magne Tjensvold, Comparison of the IEEE 802.11, 802.15.1, 802.15.4 and 802.15.6 wireless standards, Sep. 18, 2007, pp. 1-7.*
IEEE 802.15.4; http://en.wikipedia.org/wiki/IEEE_802.15.4 retrieved Jan. 16, 2015.
IEEE 802.15 WPAN™ Task Group 4g (TG4g) Smart Utility Networks http://www.ieee802,org/15/pub/TG4g.html; retrieved Jan. 16, 2015.
Wireless LAN, http://en.wikipedia.org/wiki/Wireless_LAN retrieved Jan. 16, 2015.
Ethernet, http://en.wikipedia.org/wiki/Ethernet retrieved Jan. 16, 2015.
Media access control, http://en.wikipedia.org/wiki/Media_access_control retrieved Jan. 16, 2015.
Carrier sense multiple access with collision avoidance, http://en.wikipedia.org/wiki/Carrier_sense_multiple_access_with_collision_avoidance retrieved Jan. 16, 2015.
Gaussian frequency-shift keying, http://en.wikipiedia.org/wiki/Gaussian_frequency-shift_keying retrieved Jan. 16, 2015.
Frequency-shift keying, http://en.wikipedia.org/wiki/Frequency-shift_keying retrieved Jan. 16, 2015.
Forward error correction http://en.wikipedia.org/wiki/Forward_error_correction retrieved Jan. 16, 2015.
Orthogoanl frequency-division multiplexing http://en.wikipedia.org/wiki/Orthogonal_frequency-division_multiplexing retrieved Jan. 16, 2015.

* cited by examiner

FIG. 6

| PREAMBLE | | | | | | | SFD | | |
|---|---|---|---|---|---|---|---|---|---|
| SYNCHRONIZATION BIT | | | | | | | | a | -b |
| 0 | 1 | 0 | 1 | 0 | 1 | 0 | 1 | b | a |
| | | | | | | | | b | -a |

GOLAY a: | 1 | -1 | -1 | -1 | 1 | -1 | 1 | -1 |

GOLAY b: | 1 | -1 | -1 | -1 | -1 | 1 | -1 | 1 |

WIRELESS COMMUNICATION SYSTEM, AND INTERFERENCE PREVENTING METHOD

This is a national stage of PCT/JP10/007293 filed Dec. 15, 2010 and published in Japanese, which claims the priority of Japanese number 2009-293758 filed Dec. 25, 2009, hereby incorporated by reference.

TECHNICAL FIELD

The present invention relates to providing a wireless communication system and an interference preventing method, which are suitable for preventing communication interference between two or more wireless communication networks having mutually different physical layers, of a wireless communication network that performs wireless communication among a plurality of devices and a coordinator.

BACKGROUND ART

A wireless local area network (LAN) has advantages including that space for cables is reduced, and a mobile terminal including a notebook personal computer (notebook PC) can be connected to a LAN without losing the mobility, over a wired LAN. In addition, since a high speed and low cost are implemented in the wireless LAN, the practical use of the wireless LAN is further accelerated. Based on such situations, the standardization of the wireless LAN has been worked by Institute of Electrical and Electronics Engineering (IEEE).

Particularly, in a radio packet communication system that is represented by a wireless LAN, there is a problem of a contention for wireless resources between a plurality of terminals. In order to avoid the contention for wireless resources, a medium access control (MAC) is necessary. As an MAC protocol for the wireless LAN, a carrier sense multiple access (CSMA) system has been proposed in which a terminal detects a carrier of the other terminals before transmission of a packet, which is called carrier sense, and transmits a packet in a case where the carrier is not detected. In addition, a carrier sense multiple access with collision avoidance (CSMA/CA) system has been also proposed in which a packet collision avoiding structure is added to the CSMA system.

The CSMA/CA system is a system in which communication is initiated, the communication is assumed to be successful in a case where a reply of an acknowledge (ACK) signal is received from a wireless node of a communication partner, and the occurrence of communication collision with another wireless node is assumed, and packet data is retransmitted by arranging a back off time in a case where an ACK signal is not received.

Particularly in recent years, there are many CSMA/CA systems that are in compliance with the IEEE 802.15.4 standard. The IEEE 802.15.4 standard is for wireless communication using a frequency near 868 MHz, 915 MHz, and 2.45 GHz and is particularly used for a home appliance-dedicated local area network such as Zigbee (registered trademark). In Zigbee (registered trademark), a PHY layer and an MAC layer defined in the IEEE 802.15.4 standard are used, and a network layer and an application layer, which are uppers layers thereof, are standardized. Zigbee (registered trademark) enables realization of ultra-low power consumption, miniaturization, and low cost by utilizing the features of the IEEE 802.15.4 standard.

As above, the IEEE 802.15.4 standard has attracted attention as a key technology for realizing not only a sensor network but also a home network, an office network, and a communication network for communicating with various medical apparatuses installed to a human body and for realizing a ubiquitous network society in the future.

Generally, according to wireless communication that is compliant with the IEEE 802.15.4 standard, as illustrated in FIG. 15, local area wireless communication is performed between a network coordinator (NC) 71 that controls a network 7 and a plurality of end devices (ED) 72. In addition, as an example of the network 7, a variety of network forms such as a star type, a tree type, and a mesh type can be selected.

In addition, in the wireless communication that is compliant with the IEEE 802.15.4 standard, a so-called super frame structure using a beacon is used. In the super frame structure, a beacon interval is divided into a contention access period (CAP) during which all the EDs 72 can perform access, a contention free period (CFP) during which a specific ED 72 can exclusively perform access, and an inactive period during which access of all the EDs 72 is prohibited. In addition, the CFP is equally divided into seven parts through a guaranty time slot (GTS) mechanism and can be allocated to EDs 72 for which communication is desired to be performed with high priority.

As conventional radio packet communication systems that are compliant with the IEEE 802.15.4 standard, for example, systems disclosed in Patent Literatures 1 and 2 and the like have been proposed. In addition, as a technique for suppressing the collision of packets in the CSMA/CA system to a minimum level, for example, techniques disclosed in Patent Literatures 3 and 4 have been proposed.

CITATION LIST

Patent Literature

Patent Literature 1: Japanese Patent Application Laid-Open No. 2005-102218
Patent Literature 2: Japanese Patent Application Laid-Open No. 2008-026310
Patent Literature 3: Japanese Patent Application Laid-Open No. 2004-242204
Patent Literature 4: Japanese Patent Application Laid-Open No. 2006-197177

SUMMARY OF INVENTION

Technical Problem

However, for example, as illustrated in FIG. 16, there is a case where two or more networks 7 and 7' coexist. While the network 7 is configured by an NC 71 and a plurality of EDs 72, and the network 7' is configured by an NC 71' and EDs 72', the networks perform wireless communication through different physical layers.

However, in a case where two or more networks 7 and 7' coexist as above, there is a case where mutual communication interference occurs. In other words, there is a case where communication between the NC 71 of the network 7 and the ED 72 of the network 7 is interfered by communication that is performed between the NC 71' and the ED 72' of the other network 7'. The reason for this is that there is no exchange between the NCs 71 and 71' that are responsible for the roles as central control units of the networks 7 and 7', and wireless communication is performed through independent physical layers while the existence of each other is ignored.

Thus, in a wireless communication system in which two or more networks 7 and 7' having mutually different physical layers coexist, the necessity for devising an interference preventing method capable of preventing communication interference has increased especially in recent years.

Actually, in order to prevent such communication interference, it is necessary to make negotiation between NCs 71 and 71', which control the networks 7 and 7' respectively, in advance before the start of communication. As such negotiation, for example, coexistence notification frame data used for the notification of the existence of the NC 71 is transmitted to the NC 71' from the NC 71, and the NC 71' acquires the coexistence notification frame data and can understand that the NC 71 exists in the same space. Thus, the NC 71' can perform control for preventing the communication interference between the NCs 71' and 71. Since it may not be determined that the NC 71' and the NC 71 constantly perform communication that are compliant with a same communication standard, there are cases where the coexistence notification frame data transmitted from the NC 71 may not be received or may not be read, and accordingly, there remains a problem in which communication interference may not be prevented.

The present invention is contrived in view of the above-described problems, and an object thereof is to provide a wireless communication system and an interference preventing method capable of preventing communication interference between wireless communication networks in the wireless communication system in which two or more wireless communication networks having mutually different physical layers coexist, and each one of the wireless communication networks performs wireless communication between a plurality of devices and a coordinator.

Solution to Problem

In order to solve the above-described problems, a wireless communication system according to the present invention is a wireless communication system in which two or more wireless communication networks having mutually different physical layers coexist, and wireless communication is performed between a plurality of devices and a coordinator in each one of the wireless communication networks, wherein the coordinator of one wireless communication network includes: a data generating unit that generates coexistence notification frame data used for notifying coordinators of the other wireless communication networks of existence of the coordinator; an FEC encoder that encodes the coexistence notification frame data generated by the data generating unit and inserts source data before the encoding into the encoded data as source code data so as to be set as FEC data or directly encodes the coexistence notification frame data as source code data so as to be set as the FEC data; a GFSK modulation unit that modulates the FEC data transmitted from the FEC encoder through a Gaussian frequency shifting keying system (GFSK) or an frequency shifting keying system (FSK) so as to be set as a GFSK modulated wave signal; and a transmission unit that transmits the GFSK modulated wave signal generated by the GFSK modulation unit to the coordinators of the other wireless communication networks.

An interference preventing method according to the present invention is an interference preventing method, which prevents communication interference between two or more wireless communication networks having mutually different physical layers, of a wireless communication network in which wireless communication is performed between a plurality of devices and a coordinator, the interference preventing method including: generating coexistence notification frame data that is used for notifying coordinators of the other wireless communication networks of existence of the coordinator of one wireless communication network; encoding the coexistence notification frame data generated in the generating of coexistence notification frame data and inserting source data before the encoding into the encoded data as source code data so as to be set as FEC data; modulating the FEC data that is generated in the encoding of the coexistence notification frame data and inserting of source data through a Gaussian frequency shifting keying system (GFSK) or a frequency shifting keying system (FSK) so as to be set as a modulated wave signal; and transmitting the modulated wave signal generated in the modulating of the FEC data to the coordinators of the other wireless communication networks, by using the coordinator of the one communication network; and receiving the modulated wave signal that is transmitted from the coordinator of the one wireless communication network; and acquiring the coexistence notification frame data by demodulating the received modulated wave signal and performing control for preventing communication interference with the one wireless communication network, by using the coordinators of the other wireless communication networks.

Advantageous Effects of Invention

According to the present invention that is formed by the above-described configuration, although communication is not performed between a plurality of coordinators constantly in compliance with a same communication standard, a GFSK modulated signal $u_{resm}$ is transmitted from one coordinator, and accordingly, in a case where a coordinator on the opposite side can extract Gaussian waveforms having mutually different center frequencies, the coexistence notification frame data can be decoded. In addition, in a case where a decoder is not mounted in the coordinator on the opposite side, the coexistence notification frame data can be decoded by reading the inserted source code data.

BRIEF DESCRIPTION OF DRAWINGS

FIG. 6 is a diagram that illustrates a configuration example of a preamble.

DESCRIPTION OF EMBODIMENTS

Hereinafter, an embodiment of the present invention will be described in detail with reference to the drawings.

Figure 1:
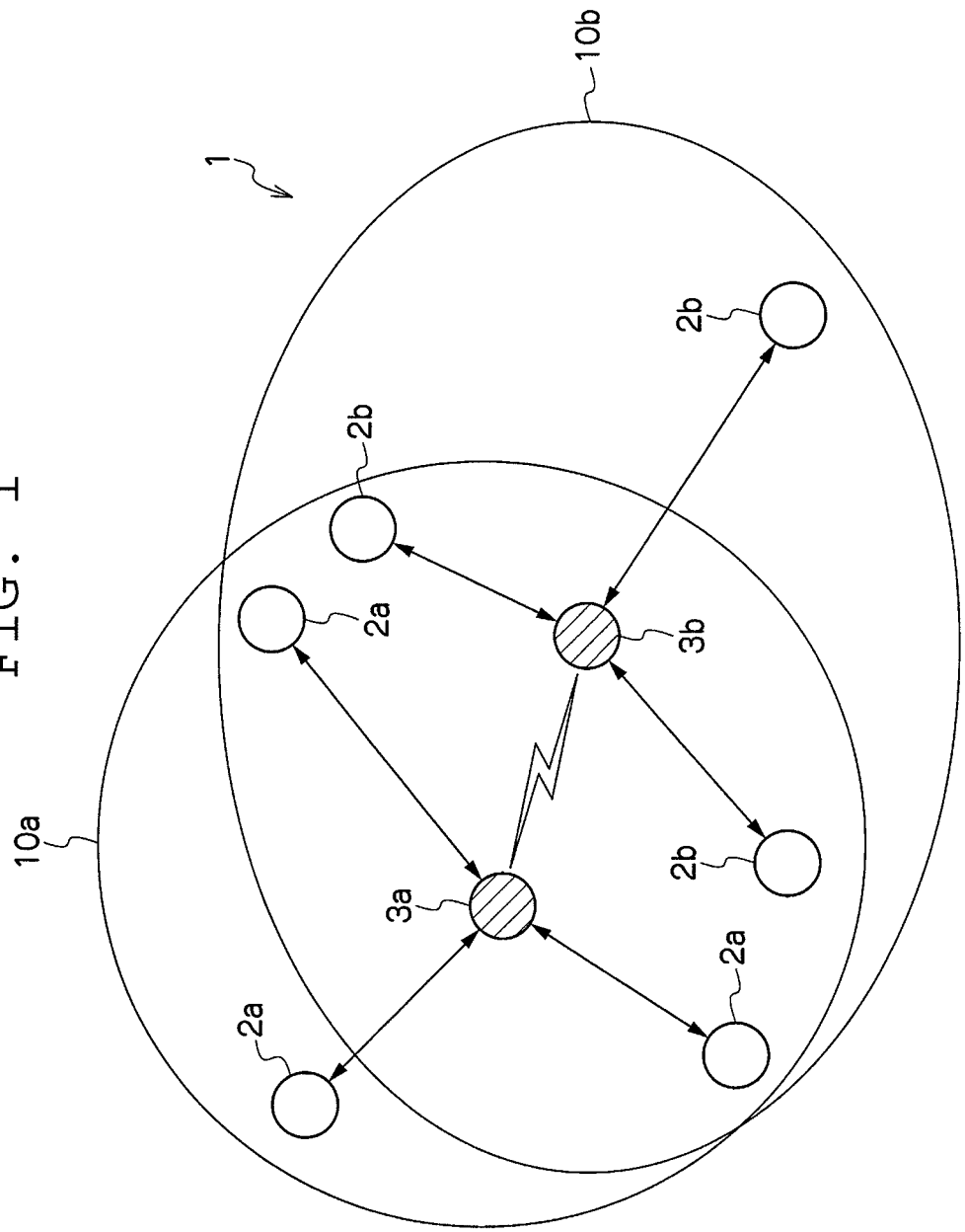
FIG. 1 is a diagram that illustrates a configuration example of a wireless communication system according to the present invention.

FIG. 1 illustrates a configuration example of a wireless communication system 1 according to the present invention. The wireless communication system 1 is configured by two wireless communication networks 10a and 10b. The wireless communication network 10a includes a plurality of devices 2a and a coordinator 3a that controls the overall operation of the network. In addition, the wireless communication network 10b includes a plurality of devices 2b and a coordinator 3b that controls the overall operation of the network.

Although a case is illustrated as an example in which the above-described wireless communication system 1 illustrated in FIG. 1 is configured by two wireless communication networks 10a and 10b, the wireless communication system is not limited thereto and may be configured by three or more wireless communication networks 10.

The wireless communication networks 10, for example, are personal area networks (PAN) that are compliant with the IEEE 802.15.4 g standard. Here, the wireless communication network 10 is not limited to the star type as illustrated in FIG. 1, but any network form such as the tree type or the mesh type may be applied thereto.

The device 2, for example, is configured by any type of mobile information terminal such as a notebook-type personal computer (notebook PC) or a cellular phone. The device 2 can perform radio packet communication with the coordinator 3 at least in the WPAN and performs radio packet communication with another device 2 through the coordinator 3.

Similarly, the coordinator 3 may have the same configuration as that of the above-described mobile information terminal. The coordinator 3 takes a role as a central control unit. The coordinator 3 acquires a beacon that is transmitted from the device 2 and, in order to connect the device 2 to the WPAN, takes a role for synchronizing them.

Each of the two wireless communication networks 10a and 10b performs wireless communication between the coordinator 3 and the device 2 through an independent physical layer. This means that the two wireless communication networks 10a and 10b perform wireless communication between the coordinators 3 and the devices 2 through mutually different physical layers.

In the wireless communication system 1 according to the present invention, in order to prevent communication interference between the wireless communication networks 10a and 10b, negotiation is made in advance between the coordinators 3a and 3b that control the wireless communication networks 10a and 10b respectively before the start of communication. In the negotiation, for example, coexistence notification frame data used for the notification of the existence of the coordinator 3a is transmitted to the coordinator 3b from the coordinator 3a, and the coordinator 3b acquires the coexistence notification frame data and understands that the coordinator 3a is present in the same space.

Figure 2:
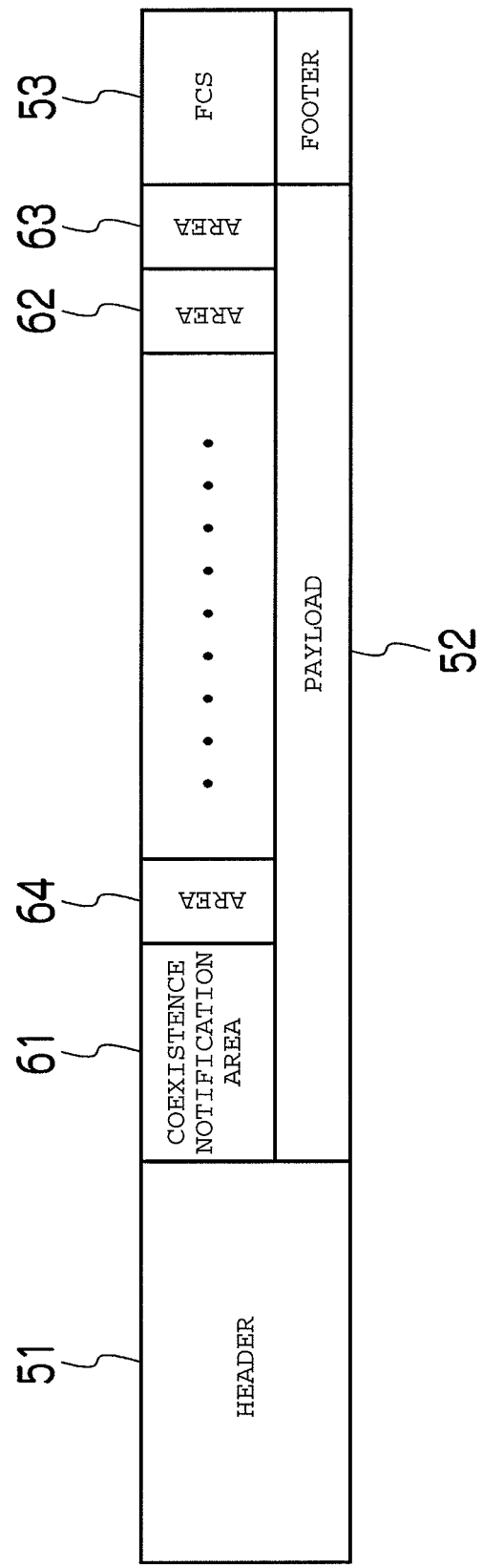
FIG. 2 is a diagram that illustrates a configuration example of coexistence notification frame data.

FIG. 2 is a diagram that illustrates a configuration example of the coexistence notification frame data. In the configuration example of the format of the coexistence notification frame data, a payload section 52 is added to a header 51 that is used for the notification of the existence, and a frame check sequence (FCS) 53 as a footer is further added to the end of the payload section 52.

In the payload section 52, an area 61 in which a gap between two coexistence notification areas is written by the coordinator 3 and an area 64 in which an interval of two beacons is written are included. In addition, in the payload section 52, an area 62 in which an offset time for offsetting an interval between the coexistence notification area 61 and successive coexistence notification frame data is written and an area 63 that is continuous to the area 62, in which information used for controlling the physical layer is written, is included.

Figure 3:
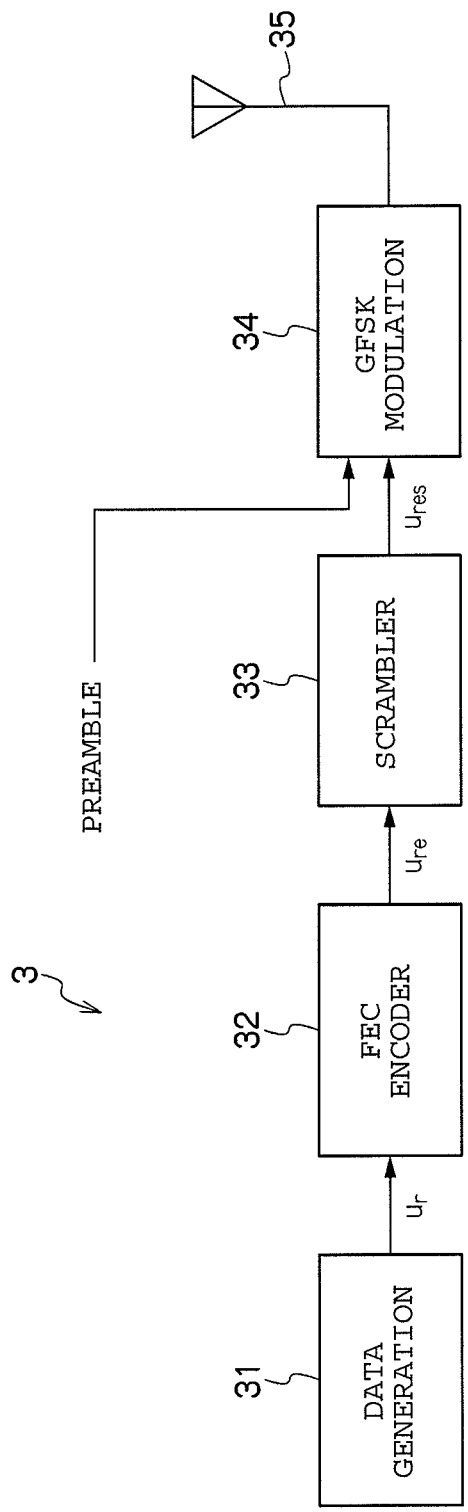
FIG. 3 is a block configuration diagram of a coordinator that is used in a wireless communication system according to the present invention.

The coexistence notification frame data is transmitted through each constituent element as illustrated in FIG. 3 inside the coordinator 3.

The coordinator 3 includes: a data generating unit 31; a forward error correction (FEC) encoder 32 that is connected to the data generating unit 31; a scrambler 33 to which an output signal output from the FEC encoder 32 is supplied; a Gaussian frequency shift keying (GFSK) modulation unit 34 that is connected to the scrambler 33; and an antenna 35 that transmits an output signal output from the GFSK modulation unit.

The data generating unit 31 generates coexistence notification frame data $u_r$ that is formed by the above-described frame configuration. The frame data $u_r$ generated by the data generating unit 31 is transmitted to the FEC encoder 32.

Figure 4:
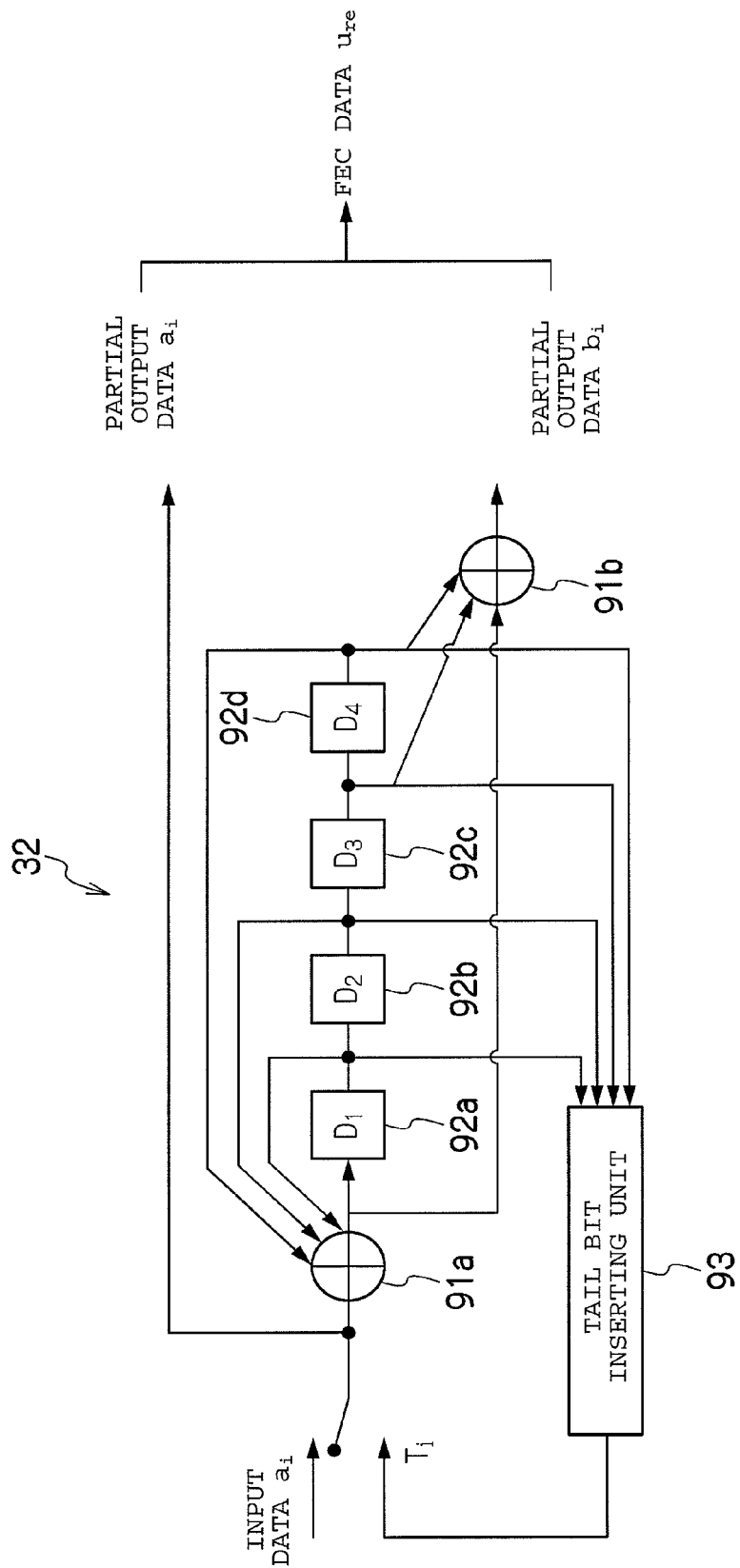
FIG. 4 is a diagram that illustrates the block configuration of an FEC encoder.

The FEC encoder 32 encodes the transmitted coexistence notification frame data $u_r$ or outputs only source code data. FIG. 4 illustrates a configuration example of the FEC encoder 32 in a case where encoding is performed.

The FEC encoder 32 sequentially encodes each data bit of the input coexistence notification frame data $u_r$ and includes four delay elements 92a to 92d that are connected in series, two adders 91a and 91b, and a tail bit inserting unit 93. The delay elements 92a to 92d are initially set to zero. A data bit is supplied to the first delay element 92a from the adder 91a. Based on each data bit, the adder 91a sums output bits output from the delay elements 92a, 92b, and 92d and outputs the sum. The adder 91b sums output bits output from the adder 91a and the delay elements 92c and 92d. In addition, the outputs output from the delay elements 92a to 92d are transmitted to the tail bit inserting unit 93. An output $T_i$ output from the tail bit inserting unit 93 is transmitted to the input end side of the adder 91a and is added to the rear of the coexistence notification frame data $u_r$.

Table 1 illustrates an example of the outputs output from the delay elements 92a to 92d and outputs $T_1$ to $T_4$ output from the tail bit inserting unit 93.

TABLE 1

| $D_1$ | $D_2$ | $D_3$ | $D_4$ | $T_1$ | $T_2$ | $T_3$ | $T_4$ |
|---|---|---|---|---|---|---|---|
| 0 | 0 | 0 | 0 | 0 | 0 | 0 | 0 |
| 1 | 0 | 0 | 0 | 1 | 0 | 0 | 0 |
| 0 | 1 | 0 | 0 | 0 | 1 | 0 | 0 |

TABLE 1-continued

| $D_1$ | $D_2$ | $D_3$ | $D_4$ | $T_1$ | $T_2$ | $T_3$ | $T_4$ |
|---|---|---|---|---|---|---|---|
| 1 | 1 | 0 | 0 | 1 | 1 | 0 | 0 |
| 0 | 0 | 1 | 0 | 1 | 0 | 1 | 0 |
| 1 | 0 | 1 | 0 | 0 | 0 | 1 | 0 |
| 0 | 1 | 1 | 0 | 1 | 1 | 1 | 0 |
| 1 | 1 | 1 | 0 | 0 | 1 | 1 | 0 |
| 0 | 0 | 0 | 1 | 1 | 1 | 0 | 1 |
| 1 | 0 | 0 | 1 | 0 | 1 | 0 | 1 |
| 0 | 1 | 0 | 1 | 1 | 0 | 0 | 1 |
| 1 | 1 | 0 | 1 | 0 | 0 | 0 | 1 |
| 0 | 0 | 1 | 1 | 0 | 1 | 1 | 1 |
| 1 | 0 | 1 | 1 | 1 | 1 | 1 | 1 |
| 0 | 1 | 1 | 1 | 0 | 0 | 1 | 1 |
| 1 | 1 | 1 | 1 | 1 | 0 | 1 | 1 |

The coexistence notification frame data $u_r$ output from the data generating unit 31 is supplied to the FEC encoder 32 in the form of a data stream. When the data stream is encoded, the FEC encoder 32 encodes data at an encoding rate of n/k. Here, n is the number of bits of the source code data that has not been encoded, and k is the actual number of bits to be encoded. In a case where encoding is not performed, n/k=1. Hereinafter, a case will be described in which the encoding rate n/k is set to 0.5.

The FEC encoder 32 generates FEC data $u_{re}$ by encoding input data $a_i$ as the input coexistence notification frame data $u_r$ through the FEC encoder 32. The input data $a_i$ is transmitted to the adder 91a and is directly regarded as partial output data $a_i$. The partial output data $a_i$ directly sets the input data $a_i$ as source data as source code data. In addition, the input data $a_i$ transmitted to the adder 91a is encoded by the FEC encoder 32, and consequently partial output data $b_i$ is output from the adder 91b.

Figure 5:
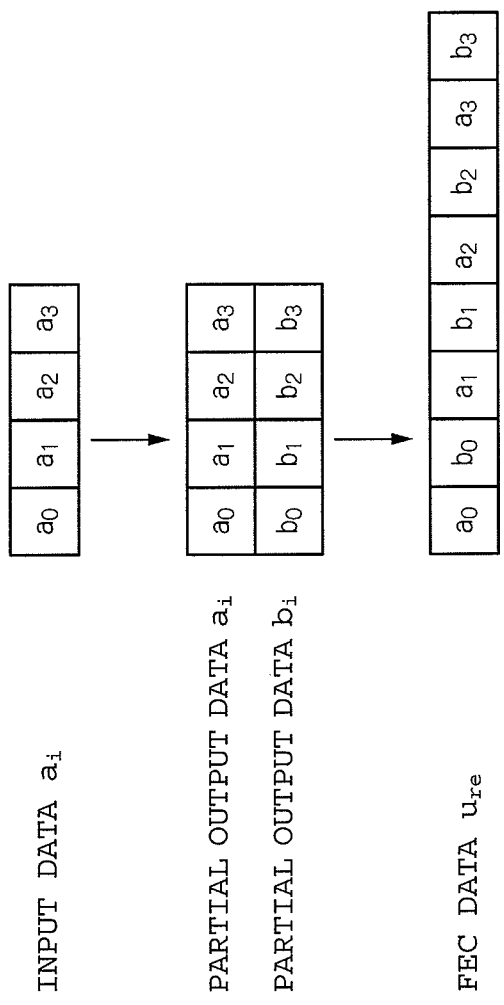
FIG. 5 is a diagram that illustrates an example until FEC data is generated based on input data.

In a case where the input data as illustrated in FIG. 5, is data configured by four bits of $(a_0, a_1, a_2, a_3)$, the partial output data $a_i$ is $(a_0, a_1, a_2, a_3)$, and the partial output data $b_i$ is $(b_0, b_1, b_2, b_3)$. The FEC data $u_{re}$ that is finally output is $(a_0, b_0, a_1, b_1, a_2, b_2, a_3, b_3)$. The coexistence notification frame data $u_r$ (input data $a_i$) is encoded so as to be the partial output data $b_i$, the source data $a_i$ before encoding is set as the partial output data $a_i$ (source code data $a_i$), and the partial output data $a_i$ is inserted into the encoded partial output data $b_i$, whereby the FEC data $u_{re}$ is generated. The FEC data $u_{re}$ is transmitted to the scrambler 33.

The scrambler 33 scrambles the bits of the FEC data $u_{re}$. The scrambler 33 performs the process of a so-called exclusive OR (XOR) of each bit of the FEC data $u_{re}$ and a random code. Hereinafter, when the random code is p, the scrambling process performed by the scrambler 33 is represented as $u_{res}=(u_{re})$ XOR (p). In addition, the configuration of the scrambler 33 is not essential and may not be provided.

The GFSK modulation unit 34 performs GFSK modulation for the FEC data $u_{res}$ output from the scrambler and the preamble. Instead of performing the GFSK modulation, modulation may be performed based on frequency shifting keying (FSK).

FIG. 6 illustrates an example of the preamble. The preamble is configured by a synchronization bit and a start frame delimiter (SFD). In the SFD, a Golay code is described. Examples of Golay a and Golay b are illustrated in FIG. 6.

Figure 7:
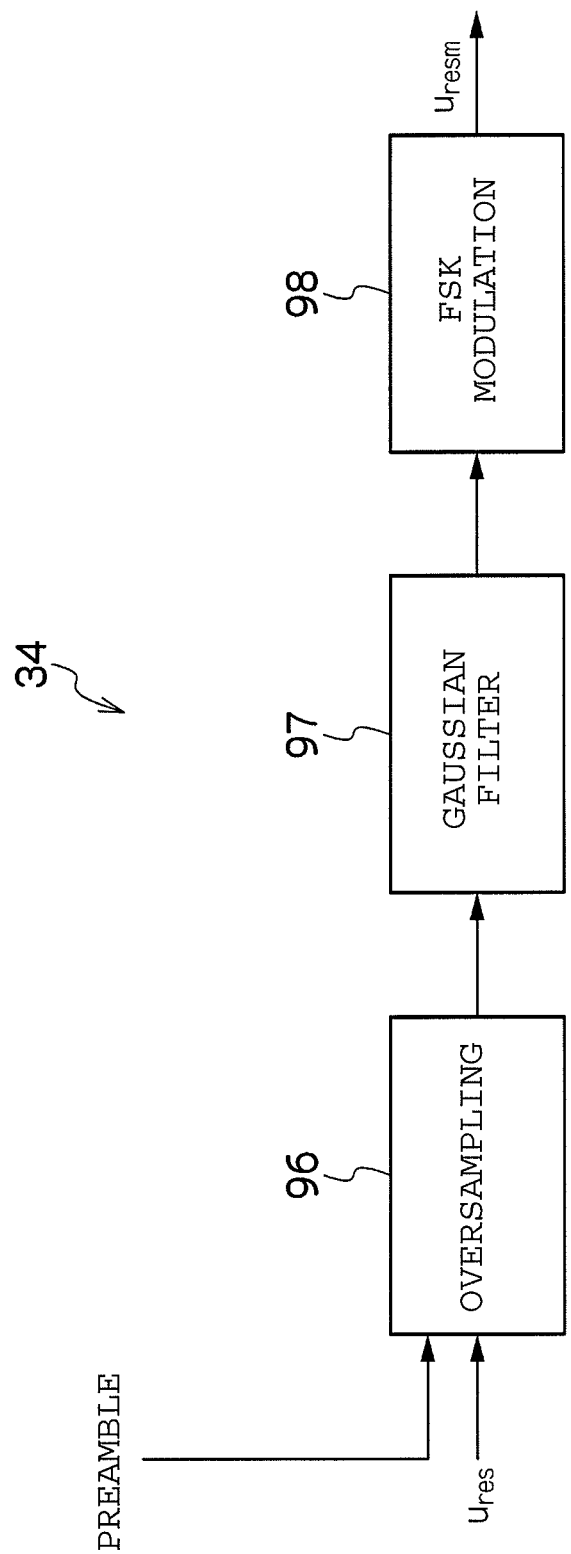
FIG. 7 is a diagram that illustrates a more detailed block configuration of a GFSK modulation unit.

First, the FEC data $u_{res}$ to which the preamble has been added, as illustrated in FIG. 7, is transmitted to an oversampling unit 96. The oversampling unit 96 performs oversampling for the FEC data $u_{res}$ and supplies resultant data to a Gaussian filter 97 or directly to an FSK 98. The Gaussian filter 97 limits the band of the input FEC data $u_{res}$ in the shape of a Gaussian waveform, and the FSK modulation unit 98 performs FSK modulation for the band-limited FEC data $u_{res}$, thereby generating a GFSK modulated wave signal $u_{resm}$. The GFSK modulated wave signal $u_{resm}$ output from the FSK modulation unit 98 is transmitted to the antenna 35.

Figure 8:
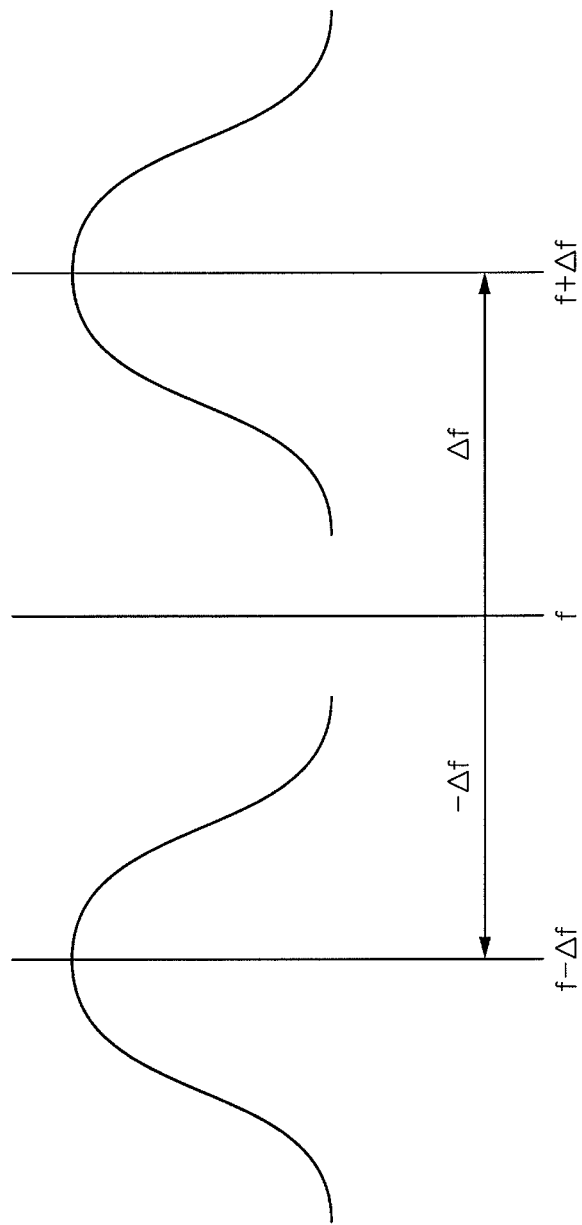
FIG. 8 is a diagram that illustrates an example of a GFSK modulated wave signal $u_{resm}$ that is generated by the GFSK modulation unit.

FIG. 8 illustrates an example of a GFSK modulated wave signal $u_{resm}$ that is generated by the GFSK modulation unit 98. Two waveforms having Gaussian forms are generated with the frequency f interposed therebetween. One waveform has a center frequency of f+Δf, and the other waveform has a center frequency of f−Δf. It may be configured such that the Gaussian waveform of f+Δf is allocated in a case where the data bit is "1", and, the Gaussian waveform of f−Δf is allocated in a case where the data bit is "0", or these may be oppositely configured.

The antenna 35 transmits the GFSK modulated wave signal $u_{resm}$. In a case where a coordinator 3b is present in the vicinity of the coordinator 3a, the GFSK modulated wave signal $u_{resm}$ transmitted from the antenna 35 of the coordinator 3a can be received by the coordinator 3b side.

Another coordinator 3b that has received the GFSK modulated signal $u_{resm}$ through the antenna and the like acquires coexistence notification frame data by demodulating and decoding the received signal. Then, the coordinator 3b performs control for preventing communication interference with one wireless communication network 10a. In a case where a decoder is not mounted in the another coordinator 3b side that has received the GFSK modulated signal $u_{resm}$, the coexistence notification frame data may be acquired by reading the inserted source code data $a_i$.

As above, although communication is not performed between coordinators 3 constantly in compliance with the same communication standard, according to the invention, a GFSK modulated signal $u_{resm}$ is transmitted from one coordinator 3a, and accordingly, in a case where a coordinator 3b on the opposite side can extract Gaussian waveforms having mutually different center frequencies, the coexistence notification frame data can be decoded. In addition, in a case where a decoder is not mounted in the coordinator 3b on the opposite side, the coexistence notification frame data can be decoded by reading the inserted source code data $a_i$.

Accordingly, in a wireless communication system 1 according to the invention, a GFSK modulated signal $u_{resm}$ transmitted from one coordinator 3a can be decoded by a coordinator 3b on the opposite side with a high probability, and mutual communication interference can be prevented. As a process for preventing mutual communication interference, while synchronization with the coordinator 3 on the opposite side is performed, communication with the device 2 may be started, or the communication may be stopped. In addition, communication with another device 2 may be started through a vacant channel.

Figure 9:
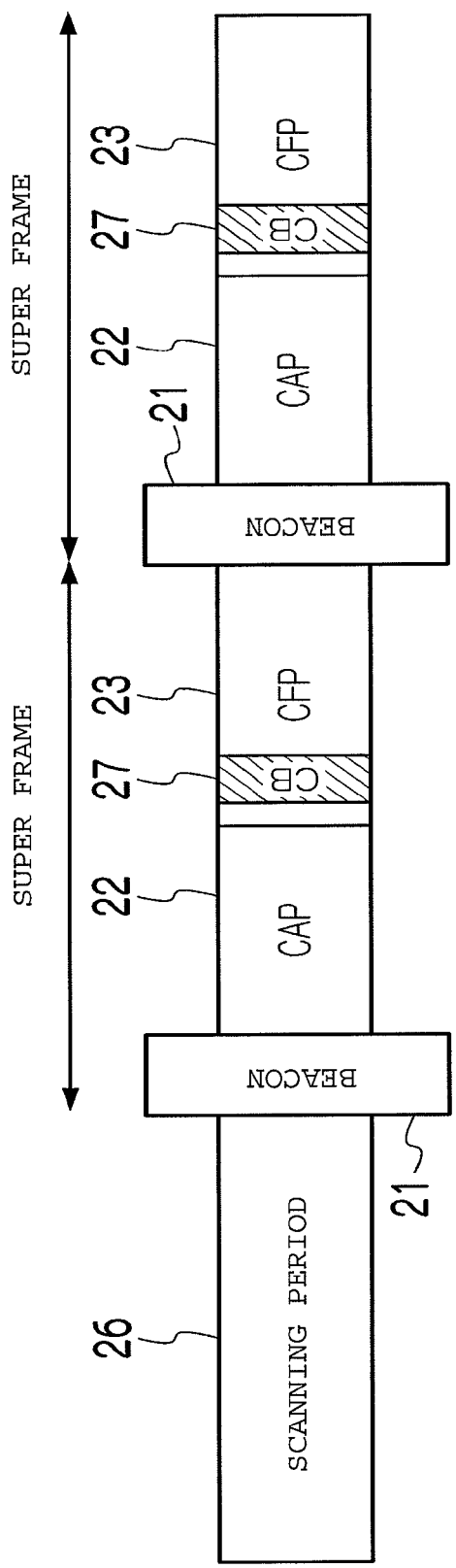
FIG. 9 is a diagram that illustrates a super frame structure used in the wireless communication system according to the present invention.

The wireless communication system 1 according to the invention, for example, as illustrated in FIG. 9, uses a so-called super frame structure using a beacon 21. The super frame has a contention access period (CAP) 22 and a contention free period (CFP) 23 after a beacon 21. A time between two beacons 21 is divided into slots of a predetermined number regardless of the period of the super frame. In addition, in the super frame structure, the number of slots that configure the CFP 23 is variable, and the number of slots that configure the CAP 22 is fixed. The CAP 22 is a period during which all the devices 2 can make access, and the CFP 23 is a period during which a specific device 2 can exclusively make access.

Furthermore, in the wireless communication system according to the invention, the coordinator 3 sequentially transmits coexistence notification signals (CB) 27 that are used for notifying the existence thereof. The CB 27 may be configured by a so-called beacon or an ordinary signal that is formed by a plurality of frames. The CB 27, for example, as a physical layer, may be based on each specification of the physical layer such as a frequency shift keying (FSK) as a frequency shifting-type modulation type for modulating a sinusoidal wave into a digital signal, an orthogonal frequency division multiplexing (OFDM) as an orthogonal frequency division multiplexing type, or a direct sequence spread spectrum (DSSS) as a direct spread type.

Table 2 illustrates an example of parameters of the CB 27 in the physical layer.

TABLE 2

| Parameter | Value |
| --- | --- |
| Data Rate | 50 kb/s |
| Symbol Rate | 50 symbols/s |
| Type | GFSK |
| Bandwidth Time | 0.5 |
| Encoding Rate | 1 |

While the CB 27 is transmitted at predetermined intervals or at random intervals, it is necessary to transmit once for one or a plurality of super frames. In addition, it is preferable that the CB 27 is transmitted at least once for one super frame. The CB 27 may belong to either the CAP 22 or the CFP 23. In addition, a scanning period 26 is arranged before a first super frame immediately after the input of power. The scanning period 26 is a period that is used for scanning a CB 27 transmitted from the coordinator 3 of another wireless communication network 10 and taking in the CB. The scanning period 26 may be a period of at least a length that is equal to or longer than a period between two CBs 27 adjacent to each other or equal to or longer than the length of the super frame.

Next, an interference preventing method will be described in detail, in which communication interference between two or more wireless communication networks 2a and 2b having mutually different physical layers is prevented by using the wireless communication system 1 according to the invention.

Figure 10:
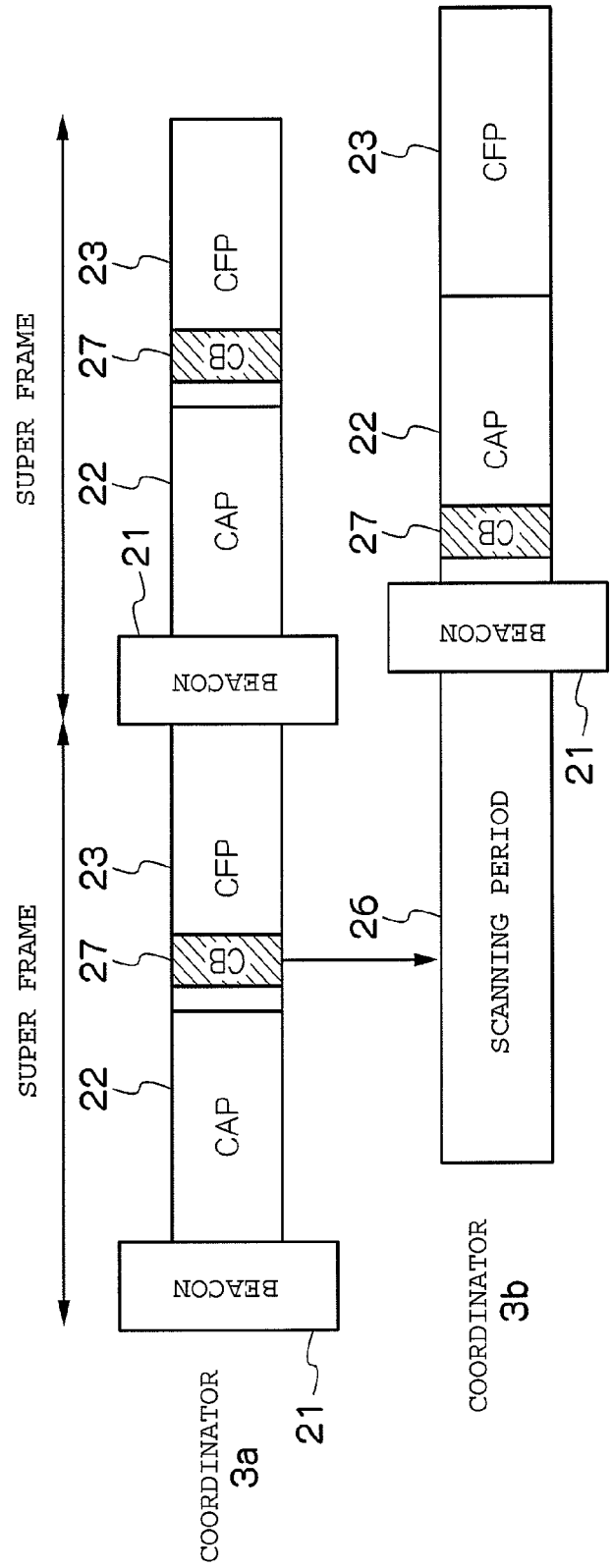
FIG. 10 is a diagram that illustrates an interference preventing method according to the present invention.

First, as illustrated in FIG. 10, it is assumed that a coordinator 3a of a wireless communication network 10a is operated and performs wireless communication with a device 2a under the above-described super frame structure. In addition, the coordinator 3a transmits a CB 27 once for one or a plurality of super frames during that interval. Thereafter, it is assumed that the power of a coordinator 3b of another wireless communication network 10b that has a physical layer different from that of the wireless communication network 10a is turned on. As a result, in the coordinator 3b, a scanning period 26 is started before a first super frame immediately after the input of power.

The scanning period 26 of the coordinator 3b, for example, as illustrated in FIG. 10, has a length that is equal to or longer than the length of the super frame. Accordingly, by transmitting the CB 27 from the coordinator 3a at the rate of once for one super frame, the coordinator 3b can scan and acquire the CB 27.

The coordinator 3b that has scanned the CB 27 can identify another coordinator 3a that is present in the vicinity thereof and can further identify the presence of the wireless communication network 10a. In a case where the CB 27 is acquired, the coordinator 3b performs control for preventing communication interference with the another wireless communication network 10b. The coordinator 3b may perform synchronization, interrupt of the communication, or start of communication through a different channel as the control for preventing communication interference.

Figure 11:
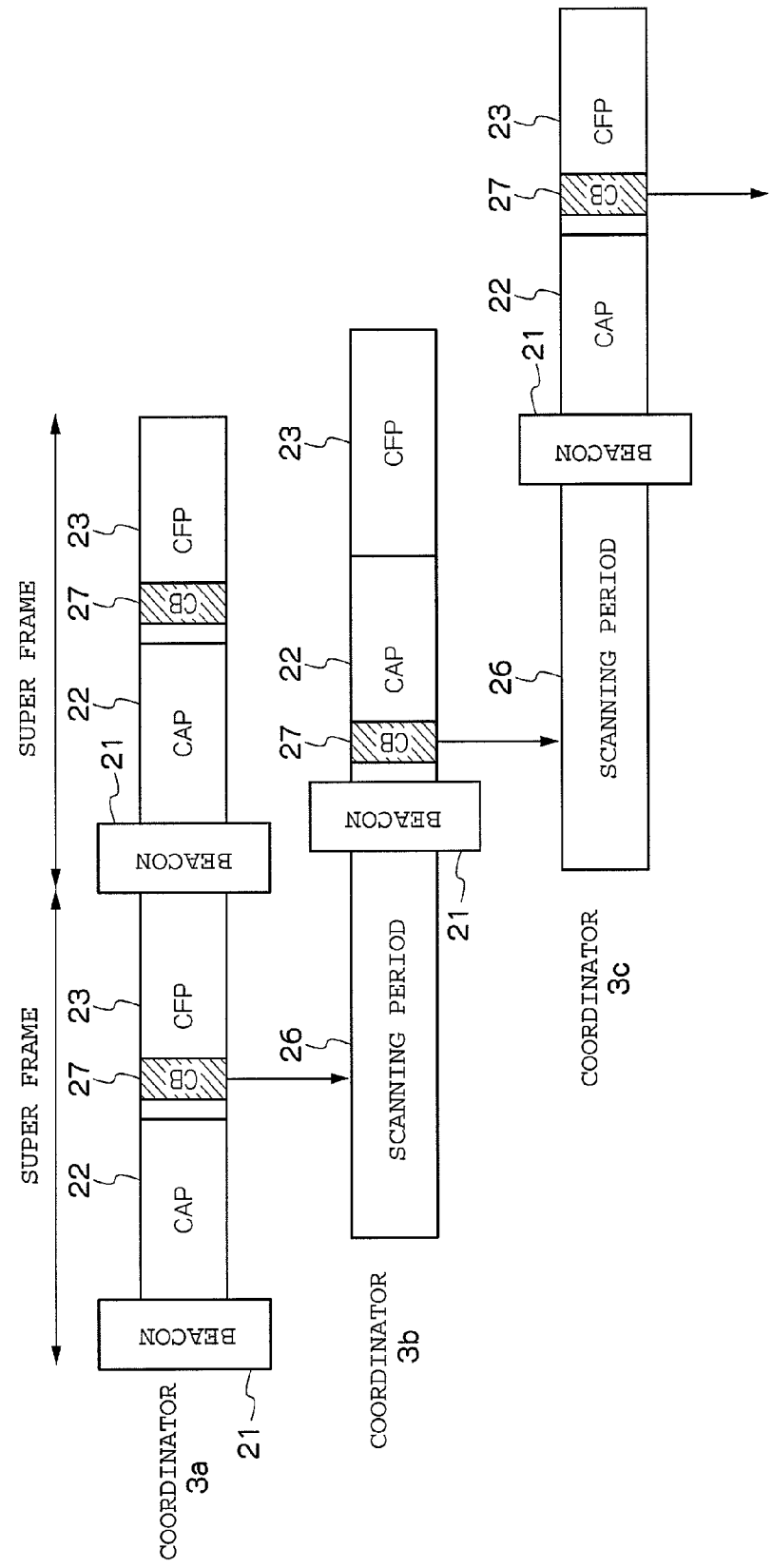
FIG. 11 is another diagram that illustrates an interference preventing method according to the present invention.

In addition, similarly, the coordinator 3b, for example, as illustrated in FIG. 11, transmits the CB 27 once or more for one super frame. As a result, in a case where the power of further another coordinator 3c is newly turned on in an interference area, the CB 27 is acquired during the scanning period 26 of the further another coordinator 3c. Then, the further another coordinator 3c performs any type of control for preventing communication interference with the another coordinator 3b based on the acquired CB 27.

Figure 12:
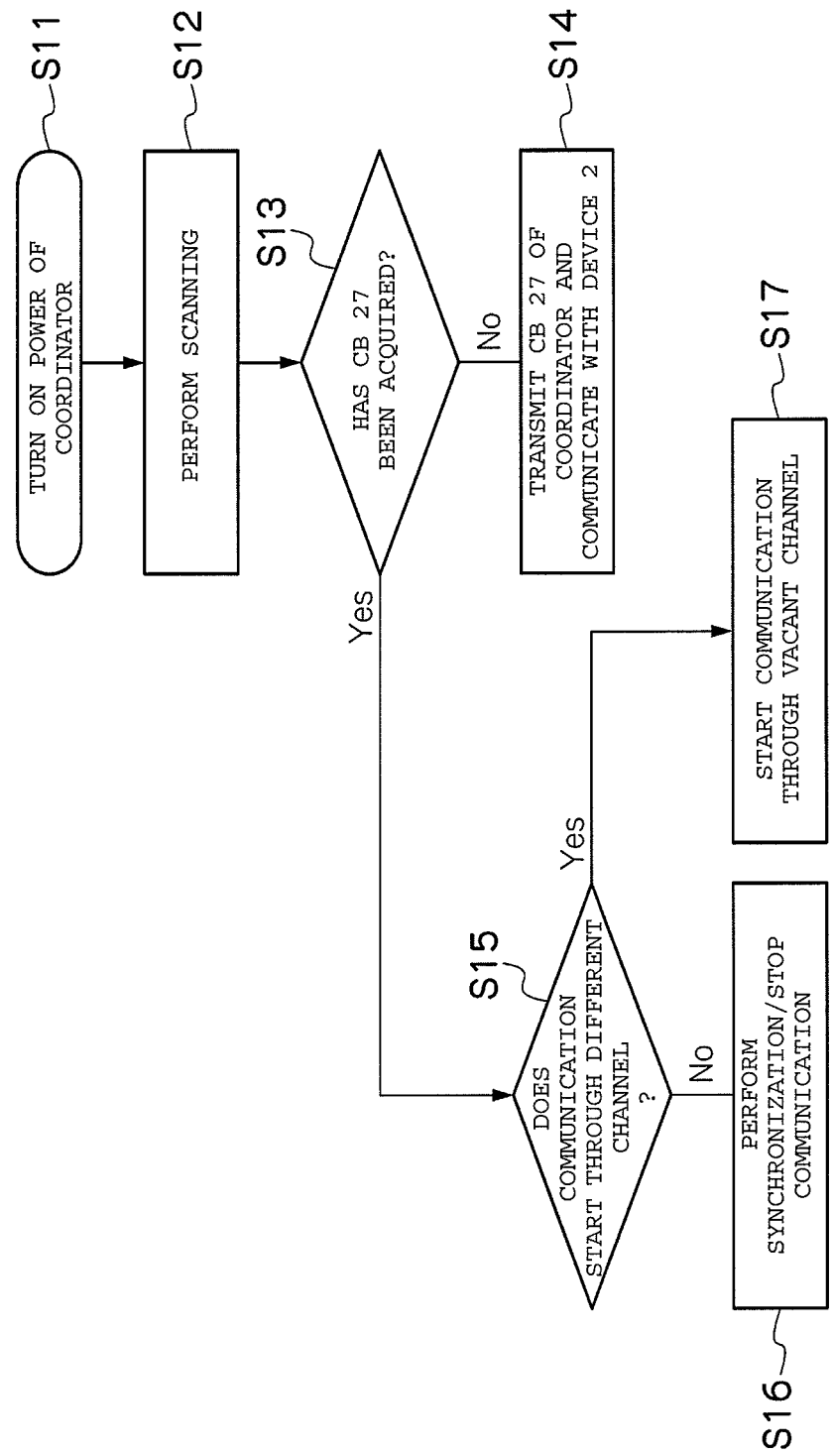
FIG. 12 is a flowchart that illustrates a process for actual interference prevention.

Each coordinator 3 is operated based on a flowchart illustrated in FIG. 12 as below.

First, after the power of the coordinator 3 is turned on in Step S11, the coordinator performs scanning during the scanning period 26 in Step S12. As a result, the process proceeds to Step S15 in a case where a CB has been acquired from another coordinator 3 in Step S23, and the process proceeds to Step S14 in a case where any CB has not been acquired in Step S23.

In a case where the process proceeds to Step S14, it represents that another coordinator 3 is not present in the vicinity thereof. In such a case, a signal in an ordinary super frame is transmitted, and the network is started. Then, the coordinator 3 transmits the CB 27 thereof at predetermined intervals or at random intervals. It may be configured such that, after an area is allocated in the super frame simultaneously with the transmission, communication with the device 2 is performed.

In a case where the process proceeds to Step S15, it represents that another coordinator 3 is present in the vicinity. In such a case, it is determined whether or not communication is to be started through a different channel. In a case where communication through a different channel has been determined not to be started, the process proceeds to Step S16, and the communication with the device 3 is started while synchronization with another coordinator is performed, or the communication is stopped. In contrast to this, in a case where communication through a different channel has been determined not to be started, the process proceeds to Step S17, and communication with another device 3 is started through a vacant channel.

In this way, even in a case where two or more wireless communication networks 10 having mutually different physical layers coexist, by performing negotiation between the coordinators 3, the occurrence of mutual communication interference can be prevented.

Figure 13:
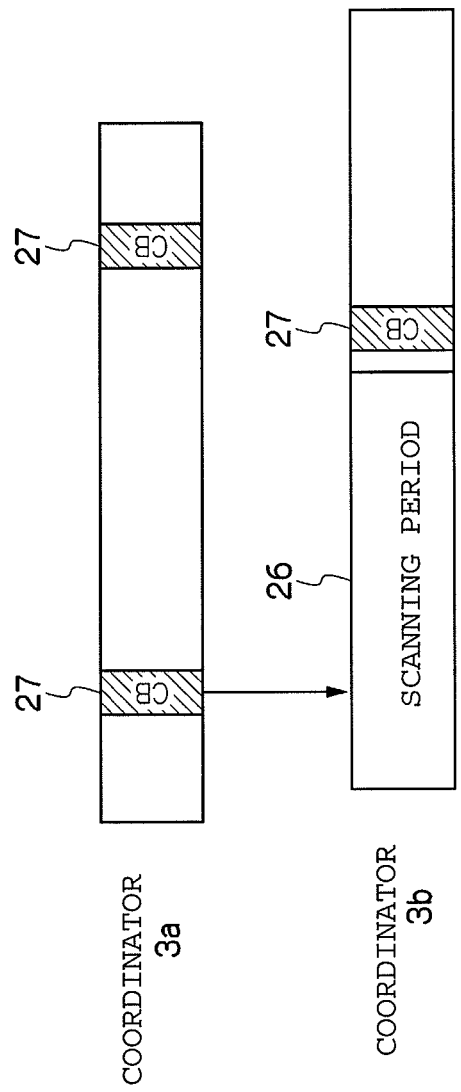
FIG. 13 is a diagram that illustrates an interference preventing method in a system that does not employ a super frame structure.

In addition, the invention is not limited to the above-described embodiment, but, as illustrated in FIG. 13, can similarly prevent communication interference in a beaconless network in which a beacon is not transmitted or a coordinator 3 that does not configure a so-called super frame structure.

First, as illustrated in FIG. 13, it is assumed that a coordinator 3a of a wireless communication network 10a is operated and performs wireless communication with a device 2a. In addition, it is assumed that the coordinator 3a sequentially transmits CBs 27 at intervals during that interval. Thereafter, it is assumed that the power of a coordinator 3b of another wireless communication network 10b having a physical layer that is different from that of the wireless communication network 10a is turned on. As a result, in the coordinator 3b, a scanning period 26 that is immediately after the input of power is started.

The scanning period 26 of the coordinator 3b has a length that is equal to or longer than the transmission interval of the CB. Accordingly, by transmitting the CB 27 from the coordinator 3a at a specific constant transmission interval, the coordinator 3b can scan and acquire the CB 27.

The coordinator 3b that has scanned the CB 27 can identify another coordinator 3a that is present in the vicinity thereof and can further identify the presence of the wireless communication network 10a. In a case where the CB 27 is acquired, the coordinator 3b can perform control for preventing communication interference with the another wireless communication network 10b.

Figure 14:
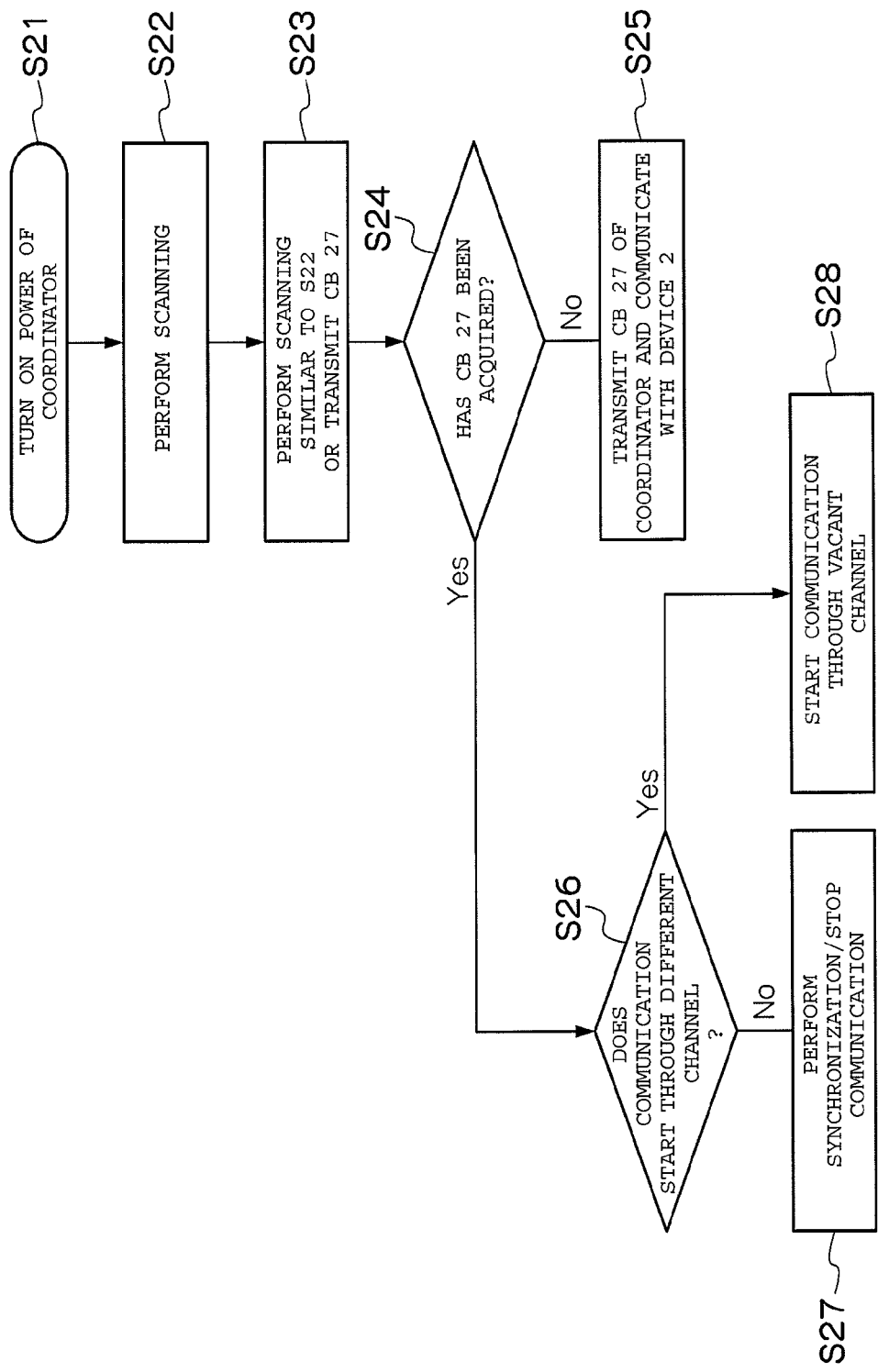
FIG. 14 is another flowchart that illustrates a process for actual interference prevention.
Figure 15:
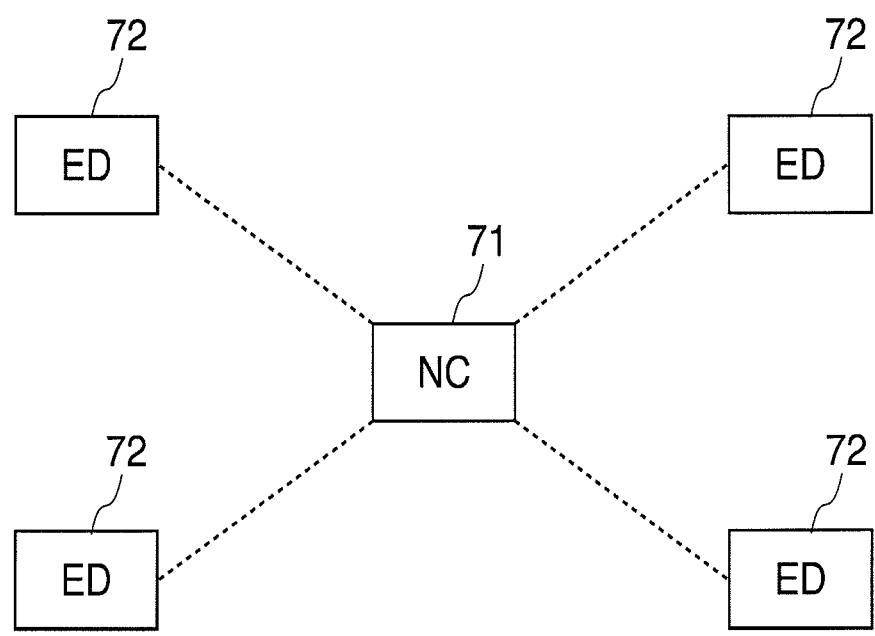
FIG. 15 is a diagram that illustrates a conventional wireless communication system that is configured by an NC and a plurality of EDs.
Figure 16:
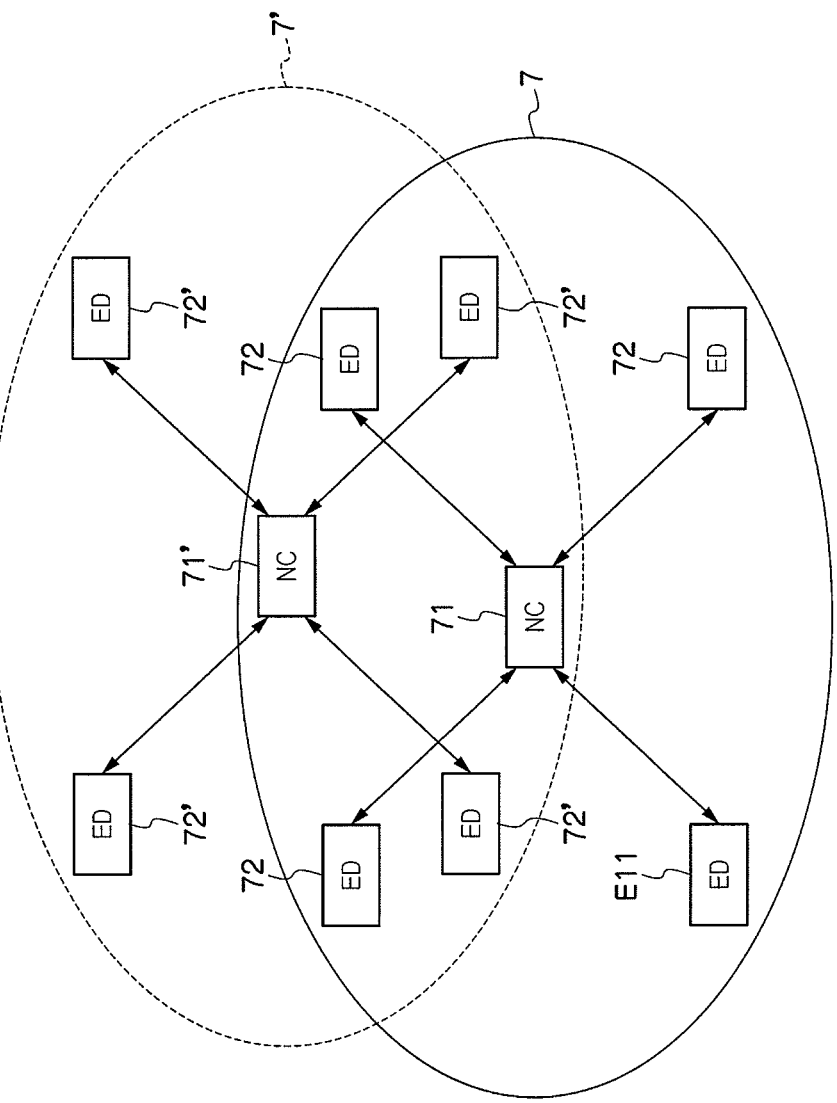
FIG. 16 is diagram that illustrates problems in the related art.

Each coordinator 3 in such a beaconless network is operated based on a flowchart that is illustrated in FIG. 14 as below.

First, after the power of the coordinator 3 is turned on in Step S21, the coordinator performs scanning during the scanning period 26 in Step S22. In addition, in Step S23, scanning that is the same as that of Step S22 is performed, or the CB 27 is transmitted. As a result, the process proceeds to Step S26 in a case where a CB has been acquired from another coordinator 3 in Step S24, and the process proceeds to Step S25 in a case where any CB has not been acquired in Step S24.

In a case where the process proceeds to Step S25, it represents that another coordinator 3 is not present in the vicinity thereof. In such a case, the coordinator 3 transmits the CB 27 thereof at predetermined intervals or at random intervals. It may be configured such that, simultaneously with the transmission, communication with the device 2 is performed.

In a case where the process proceeds to Step S26, it represents that another coordinator 3 is present in the vicinity. In such a case, it is determined whether or not communication is to be started through a different channel. In a case where communication through a different channel has been determined not to be started, the process proceeds to Step S27, and the communication with the device 2 is started while synchronization with another coordinator is performed, or the communication is stopped. In contrast to this, in a case where communication through a different channel has been determined not to be started, the process proceeds to Step S28, and communication with another device 2 is started through a vacant channel.

REFERENCE SIGNS LIST

1 Wireless communication system
2 Device
3 Coordinator
10 Wireless communication network
21 Beacon
22 CAP
23 CFP
26 Scanning period
27 CB
31 Data generating unit
32 FEC encoder
33 Scrambler
34 GFSK modulation unit
35 Antenna
51 Header
52 Payload section
53 FCS
61 Coexistence notification area
62, 63 Area
92 Delay element
91 Adder
93 Tail bit inserting unit
96 Oversampling unit
97 Gaussian filter
98 GFSK modulation unit

The invention claimed is:

1. A wireless communication system comprising:
two or more coexisting wireless communication networks having mutually different physical layers, each network having a plurality of devices and a coordinator, wireless communication being performed between said plurality of devices and the coordinator in each of the wireless communication networks, said coordinator configured to enter a scanning period upon initial input of power and thereafter transmitting in a superframe format, said scanning period having a length that is equal to or longer than a length of a superframe; and
the coordinator of one wireless communication network including:
a data generating unit that generates coexistence notification frame data used for notifying coordinators of the other wireless communication network(s) of existence of the coordinator;
an FEC encoder that encodes the coexistence notification frame data generated by the data generating unit and inserts source data before the encoding into the encoded data as source code data so as to be set as FEC data;
a modulation unit that modulates the FEC data transmitted from the FEC encoder through a Gaussian frequency shifting keying system (GFSK) or a frequency shifting keying system (FSK) so as to be set as a modulated wave signal; and
a transmission unit that transmits the modulated wave signal generated by the modulation unit to the coordinators of the other wireless communication network(s), said coexistence notification frame data being transmitted once for at least one superframe; and
said coordinator of the one wireless communication network being configured to acquire the coexistence notification frame data transmitted by another coordinator of another wireless communication network that is present in a vicinity during the scanning period and, upon acquiring the coexistence notification frame data of the another coordinator, to perform control for preventing communication interference with the another wireless communication network.

2. The wireless communication system according to claim 1, wherein the coordinator of the one wireless communication network further includes a scrambler that scrambles bits of the FEC data that is output from the FEC encoder, and wherein the modulation unit modulates the FEC data that is output from the scrambler through the GFSK or the FSK.

3. The wireless communication system according to claim 1, wherein each coordinator of the other wireless communication network(s) includes a reception unit that receives the GFSK modulated wave signal that is transmitted from, the transmission unit of the coordinator of the one wireless communication network, acquires the coexistence notification frame data by demodulating the received modulated wave signal, and performs control for preventing communication interference with the one wireless communication network.

4. The wireless communication system according to claim 3, wherein each coordinator of the other wireless communication networks, in a case where a decoder is not mounted therein, acquires the coexistence notification frame data by reading the source code data.

5. A coordinator of one wireless communication network that is used in a wireless communication system in which two or more wireless communication networks having mutually different physical layers coexist, and wireless communication is performed between a plurality of devices and a coordinator in each one of the wireless communication networks in said system, said coordinator configured to enter a scanning period upon initial input of power and thereafter transmitting in a superframe format, said scanning period having a length that is equal to or longer than a length of a superframe, said coordinator of the one wireless communication network comprising:

a data generating unit that generates coexistence notification frame data used for notifying coordinators of the other wireless communication network(s) of existence of the coordinator;

an FEC encoder that encodes the coexistence notification frame data generated by the data generating unit and inserts source data before the encoding into the encoded data as source code data so as to be set as FEC data;

a modulation unit that modulates the FEC data transmitted from the FEC encoder through a Gaussian frequency shifting keying system (GFSK) or a frequency shifting keying system (FSK) so as to be set as a modulated wave signal; and a transmission unit that transmits the modulated wave signal generated by the modulation unit to the coordinators of the other wireless communication network(s), said coexistence notification frame data being transmitted once for at least one superframe; and said coordinator of the one wireless communication network being configured to acquire the coexistence notification frame data transmitted by another coordinator of another wireless communication network that is present in a vicinity during the scanning period and, upon acquiring the coexistence notification frame data of the another coordinator, to perform control for preventing communication interference with the another wireless communication network.

6. An interference preventing method, which prevents communication interference between two or more wireless communication networks having mutually different physical layers, of a first wireless communication network in which wireless communication is performed between a plurality of devices and a coordinator, said coordinator configured to enter a scanning period upon initial input of power and thereafter transmitting in a superframe format, said scanning period having a length that is equal to or longer than a length of a superframe, the interference preventing method comprising:

generating, by the coordinator of the first wireless communication network, coexistence notification frame data that is used for notifying coordinators of the other wireless communication network(s) of existence of the coordinator of the first wireless communication network;

encoding, by said coordinator, the coexistence notification frame data generated in the generating of coexistence notification frame data and inserting source data before the encoding into the encoded data as source code data so as to be set as FEC data;

modulating, by said coordinator, the FEC data that is generated in the encoding of the coexistence notification frame data and inserting of source data through a Gaussian frequency shifting keying system (GFSK) or a frequency shifting keying system (FSK) so as to be set as a modulated wave signal;

transmitting, by said coordinator, the modulated wave signal generated in the modulating of the FEC data to the coordinators of the other wireless communication network(s), said coexistence notification frame data being transmitted once for at least one superframe; and said coordinator of the first wireless communication network being configured to acquire the coexistence notification frame data transmitted by another coordinator of another wireless communication network that is present in a vicinity during the scanning period and, upon acquiring the coexistence notification frame data of the another coordinator, to perform control for preventing communication interference with the another wireless communication network.

7. The method as set forth in claim 6, wherein the acquiring the coexistence notification frame data includes demodulating the received modulated wave signal.

8. The method as set forth in claim 6, wherein the acquiring the coexistence notification frame data includes reading the source code data.

9. The method as set forth in claim 6, wherein said transmitting includes transmitting said coexistence notification frame data at predetermined intervals.

10. The method as set forth in claim 6, wherein said transmitting includes transmitting said coexistence notification frame data at random intervals.

11. The method as set forth in claim 6, wherein said transmitting includes transmitting said coexistence notification frame data at a rate of once for one superframe.

12. The wireless communication system as set forth in claim 1, wherein said coexistence notification frame data is transmitted at predetermined intervals.

13. The wireless communication system as set forth in, claim 1, wherein said coexistence notification frame data is transmitted at random intervals.

14. The wireless communication system as set forth in claim 1, wherein said coexistence notification frame data is transmitted at a rate of once for one superframe.

15. The wireless communication system as set forth in claim 1, wherein said coordinator of the one wireless communication network acquires the coexistence notification frame data transmitted by another coordinator by reading the source code data.

16. The coordinator as set forth in claim 5, wherein said coexistence notification frame data is transmitted at predetermined intervals.

17. The coordinator as set forth in claim 5, wherein said coexistence notification frame data is transmitted at random intervals.

18. The coordinator as set forth in claim 5, wherein said coexistence notification frame data is transmitted at a rate of once for one superframe.

19. The coordinator as set forth in claim 5, wherein said coordinator acquires the coexistence notification frame data transmitted by another coordinator by reading the source code data.

20. A wireless communication system in which two or more wireless communication networks having mutually different physical layers coexist, and wireless communication is performed between a plurality of devices and a coordinator in each one of the wireless communication networks, wherein the coordinator of one wireless communication network comprises:

a data generating unit that generates coexistence notification frame data used for notifying coordinators of the other wireless communication network(s) of existence of the coordinator;

an FEC encoder that encodes the coexistence notification frame data generated by the data generating unit and inserts source data before the encoding into the encoded, data as source code data so as to be set as FEC data;

a modulation unit that modulates the FEC data transmitted from the FEC encoder through a Gaussian frequency shifting keying system (GFSK) or a frequency shifting keying system (FSK) so as to be set as a modulated wave signal;

a transmission unit that transmits the modulated wave signal generated by the modulation unit to the coordinators of the other wireless communication network (s); and each coordinator of the other wireless communication network(s) includes a reception unit that receives the GFSK modulated wave signal that is transmitted from the transmission unit of the coordinator of the one wireless communication network, acquires the coexistence notification frame data by demodulating the received modulated wave signal, and performs control for preventing communication interference with the one wireless communication network, said each coordinator of the other wireless communication network(s), in a case where a decoder is not mounted therein, acquiring the coexistence notification frame data by reading the source code data.

* * * * *